United States Patent [19]

McBrayer

[11] 4,381,352

[45] Apr. 26, 1983

[54] PROCESS FOR REINFORCED REACTION INJECTION MOLDING OF POLYURETHANES

[75] Inventor: Robert L. McBrayer, Lincoln Park, Mich.

[73] Assignee: BASF Wyandotte Corporation, Wyandotte, Mich.

[21] Appl. No.: 292,258

[22] Filed: Aug. 12, 1981

[51] Int. Cl.³ .............................................. C08G 18/14
[52] U.S. Cl. .................................... 521/115; 521/122
[58] Field of Search ............. 521/122, 115; 260/37 N

[56] References Cited

U.S. PATENT DOCUMENTS

| | | | |
|---|---|---|---|
| 2,973,382 | 2/1961 | Dreher | 260/22 R |
| 3,892,691 | 7/1975 | White et al. | 521/176 |
| 4,102,833 | 7/1978 | Salisburg | 521/176 |
| 4,243,760 | 1/1981 | McDaniel et al. | 521/176 |
| 4,288,563 | 9/1981 | Thorpe | 521/122 |

FOREIGN PATENT DOCUMENTS 1157326 7/1957 Fed. Rep. of Germany.

Primary Examiner—Maurice J. Welsh
Attorney, Agent, or Firm—Norbert M. Lisicki

[57] ABSTRACT

A reinforced reaction injection molding of polyurethanes is prepared by reacting an organic polyisocyanate, a polyoxyalkylene polyether polyol, a chain extending agent, a catalyst, optionally a blowing agent and glass fibers. The glass fibers form a stabilized dispersion in the polyol by employing as a suspending agent the reaction product of a polyamine and a polyester.

8 Claims, No Drawings

PROCESS FOR REINFORCED REACTION INJECTION MOLDING OF POLYURETHANES

BACKGROUND OF THE INVENTION

1. Field of the Invention

This invention relates to the process for the preparation of reinforced reaction injection molded polyurethane foams. It more particularly relates to the process for the preparation of reinforced reaction injection molded polyurethane foams employing stabilized milled glass fiber dispersions in polyoxyethylene polyether polyol.

2. Description of the Prior Art

The automotive industry is faced with legislative mandates which require improved fuel economy standards. In order to achieve these higher fuel economy goals, the automotive industry has downsized large vehicles. Furthermore, the automotive industry has investigated the use of lower weight materials. Among the types of materials which may be employed are those produced by reinforced reaction injection molded polyurethanes. In order for these products to meet the demanding requirements for their application, they must be sufficiently rigid to be self supporting, have thermal dimensional stability to allow for normal processing operations at elevated temperatures, have low coefficients of thermal expansion, have a class A surface and good paintability, and enjoy good impact characteristics at low temperatures. Low coefficients of thermal expansion may be improved by the addition of milled glass fibers to the polyurethane matrix. Further, in order to enjoy the required thermal dimensional stability to allow the processor to, for example, paint at elevated temperatures, the urethane products must pass a heat sag test in the neighborhood of 165° C. in order to be practical for use in the painting applications as practiced by the automotive industry.

The reinforced reaction injection molded polyurethanes of the instant invention are generally prepared by reacting a mixture of polyoxyalkylene polyether polyol with various polyisocyanates and incorporating in the polyol component milled glass fibers in the presence of a wetting agent which promotes a stable dispersion of the glass fibers in the polyol.

U.S. Pat. No. 3,892,691 teaches the preparation of polyurethane products employing quasi prepolymers of diphenylmethanediisocyanate and dipropylene glycols together with a polypropylene ether triol such as is prepared by the reaction of ethylene and propylene oxide with trimethylolpropane or glycerol and the use of the chain extender 1,4-butanediol.

U.S. Pat. No. 4,243,760 teaches the preparation of reaction injection molded polyurethane products by employing chain extending agents such as ethylene glycol, propylene glycol and 1,4-butanediol.

U.S. Pat. No. 4,102,833 also teaches the preparation of reaction injection molded urethanes by employing long chain polyols together with a short chain diol or triol such as ethylene glycol or glycerol.

None of the prior art, however, discloses the utility of employing a wetting agent suitable for forming a stabilized dispersion of glass fibers in polyols for the preparation of reinforced reaction injection molded microcellular foams.

SUMMARY OF THE INVENTION

This invention comprises a process for the preparation of reinforced reaction injection molded (RRIM) polyurethane microcellular foams comprising the reaction product of an organic polyisocyanate, polyoxyalkylene polyether polyol, catalysts, chain extending agents, optionally a blowing agent, and a stabilized dispersion of milled glass fibers in the polyol employing as a suspending agent the reaction product of a polyester and a polyamine sold under the trademark BYK-W980 by BYK-Mallinckrodt Chemical Produkte GmBH.

DETAILED DESCRIPTION OF THE INVENTION

Polyurethane compositions used in making reinforced reaction injection molded polyurethane microcellular foams are prepared in the usual manner using conventional techniques. It is further well known that microcellular products must be cured at temperatures ranging from 250° F. to 350° F. to have the desired improved physical properties of thermal dimensional stability. The microcellular product of the instant invention is prepared employing reaction products which contain dispersed therein, milled glass fibers having a filament length ranging from about 0.01 mm to about 10 mm and a diameter ranging from 0.005 to about 0.1 mm. The suspending agent employed is sold under the trademark BYK-W980 as disclosed above. The concentrations of suspending agent employed are those which effectively form a stable dispersion of glass fibers in either the polyol component the resin mixture or the isocyanate component, preferably in the polyol component. This is dependent upon the concentration range of glass fiber employed. The concentration of wetting agent may be from 0.01 part to 1.0 part per 100 parts of polyol. The concentration of glass fiber in the final foam product ranges from about 5 percent to about 50 percent based on the weight of the foam.

The compound BYK-W980 is reputedly the reaction product of a polyester and a polyamine, having a molecular weight of about 1000. The specific gravity 20/4° C. of the product is 0.99 and has 80 percent active ingredients with the remainder butyl cellosolve solvent. The elemental analysis of the product shows it to be 67.6 percent carbon, 10.7 percent hydrogen, 2.3 percent nitrogen and 19.3 percent oxygen. The product and process for the preparation of BYK-W980 are disclosed in German Patent No. 1,157,326 which disclosure is incorporated herein by reference.

The heat sag test employed was according to ASTM D-3769-79. This test employs a 4 mm thick specimen with a 100 mm overhang at a temperature of 125° C. for 60 minutes. Modifications of this test may also be employed using a 150 mm overhanging specimen.

Although any polyoxyalkylene polyether polyols may be employed, the preferred high molecular weight polyether polyols are those which contain grafted therein vinylic monomers.

The polyols which have incorporated therein the vinylic polymers may be prepared (1) by the in situ free-radical polymerization of an ethylenically unsaturated monomer or mixture of monomers in a polyol, or (2) by dispersion in a polyol of a preformed graft polymer prepared by free-radical polymerization in a solvent such as described in U.S. Pat. Nos. 3,931,092, 4,014,846, 4,093,573, and 4,122,056, the disclosures of which are herein incorporated by reference, or (3) by low temperature polymerization in the presence of chain transfer agents. These polymerizations may be carried out at a temperature between 65° C. and 170° C., preferably between 75° C. and 135° C.

The amount of ethylenically unsaturated monomer employed in the polymerization reaction is generally from one percent to 60 percent, preferably from 10 percent to 40 percent, based on the total weight of the product. The polymerization occurs at a temperature between about 80° C. and 170° C., preferably from 75° C. to 135° C.

The polyols which may be employed in the preparation of the graft polymer dispersions are well known in the art. Both conventional polyols essentially free from ethylenic unsaturation such as those described in U.S. Reissue Pat. No. 28,715 and unsaturated polyols such as those described in U.S. Pat. Nos. 3,652,659 and Reissue 29,014 may be employed in preparing the graft polymer dispersions used in the instant invention, the disclosures of which are incorporated by reference. Representative polyols essentially free from ethylenic unsaturation which may be employed are well known in the art. They are often prepared by the catalytic condensation of an alkylene oxide or mixture of alkylene oxides either simultaneously or sequentially with an organic compound having at least two active hydrogen atoms such as evidenced by U.S. Pat. Nos. 1,922,459; 3,190,927, and 3,346,557, the disclosures of which are incorporated by reference.

Representative polyols include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric sulfur-containing esters, polyacetals, aliphatic polyols and thiols, ammonia, and amines including aromatic, aliphatic, and heterocyclic amines, as well as mixtures thereof. Alkylene oxide adducts of compounds which contain two or more different groups within the above-defined classes may also be used such as amino alcohols which contain an amino group and a hydroxyl group. Also, alkylene oxide adducts of compounds which contain one —SH group and one —OH group as well as those which contain an amino group and a —SH group may be used. Generally, the equivalent weight of the polyols will vary from 100 to 10,000, preferably from 1000 to 3000.

Any suitable hydroxy-terminated polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexanedicarboxylic acid. Any suitable polyhydric alcohol may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, sorbitol and sucrose. Also included within the term "polyhydric alcohol" are compounds derived from phenol such as 2,2'-bis(4,4'-hydroxyphenyl)propane, commonly known as Bisphenol A.

Any suitable polyoxyalkylene polyether polyol may be used such as the polymerization product of an alkylene oxide or of an alkylene oxide with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-tetramethylene and polyoxyethylene glycols, and copolymer glycols prepared from blends or sequential addition of two or more alkylene oxides. The polyoxyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459. Those preferred are the ethylene, propylene and butylene oxide adducts of ethylene glycol, propylene glycol, butylene glycol, glycerol, 1,1,1-trimethylolpropane, 1,1,1-trimethylolethane, 1,2,6-hexanetriol, α-methyl-glucoside, pentaerythritol, sorbitol, 2,2'-(4,4'-hydroxyphenyl)propane and sucrose and mixtures thereof with equivalent weights from 100 to 5000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two -SH groups such as 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylenedianiline, the condensation products of aniline and formaldehyde, and 2,4-diaminotoluene; aliphatic amines such as methylamine, triisopropanolamine, ethylenediamine, 1,3-diaminopropane, 1,3-diaminobutane, and 1,4-diaminobutane.

Also, polyols containing ester groups can be employed in preparing the graft polymer dispersions. These polyols are prepared by the reaction of an alkylene oxide with an organic dicarboxylic acid anhydride and a compound containing reactive hydrogen atoms. A more comprehensive discussion of these polyols and their method of preparation can be found in U.S. Pat. Nos. 3,585,185; 3,639,541 and 3,639,542.

The unsaturated polyols which may be employed for preparation of graft copolymer dispersions may be prepared by the reaction of any conventional polyol such as those described above with an organic compound having both ethylenic unsaturation and a hydroxyl, carboxyl, anhydride, isocyanate or epoxy group or they may be prepared by employing an organic compound having both ethylenic unsaturation and a hydroxyl, carboxyl, anhydride, or epoxy group as a reactant in the preparation of the conventional polyol. Representative of such organic compounds include unsaturated mono- and polycarboxylic acids and anhydrides such as maleic acid and anhydride, fumaric acid, crotonic acid and anhydride, propenyl succinic anhydride, and halogenated maleic acids and anhydrides, unsaturated polyhydric alcohols such as 2-butene-1,4-diol, glycerol allyl ether, trimethylolpropane allyl ether, pentaerythritol allyl ether, trimethylolpropane allyl ether, pentaerythritol allyl ether, pentaerythritol vinyl ether, pentaerythritol diallyl ether, and 1-butene-3,4-diol, unsaturated epoxides such as 1-vinylcyclohexene monoxide, butadiene monoxide, vinyl glycidyl ether, glycidyl methacrylate and 3-allyloxypropylene oxide.

As mentioned above, the graft polymer dispersions used in the invention are prepared by the in situ polymerization of an ethylenically unsaturated monomer or a mixture of ethylenically unsaturated monomers, either in a solvent or in the above-described polyols. Representative ethylenically unsaturated monomers which may be employed in the present invention include butadiene, isoprene, 1,4-pentadiene, 1,5-hexadiene, 1,7-octadiene, styrene, α-methylstyrene, methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, acetoxystyrene, methyl-4-vinylbenzoate, phenoxystyrene, p-vinyldiphenyl sulfide, p-vinylphenyl phenyl oxide, and the like; the acrylic and substituted acrylic monomers such as acrylonitrile, acrylic acid, methacrylic acid, methylacrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl α-chloroacrylate, ethyl α-ethoxyacrylate, methyl α-acetaminoacrylate, butyl acrylate, 2-ethylhexyl acrylate, phenyl acrylate, phenyl methacrylate, α-chloroacrylonitrile, methacrylonitrile, N,N-dimethylacrylamide, N,N-dibenzylacrylamide, N-butylacrylamide, methacryl formamide, and the like; the vinyl esters, vinyl ethers, vinyl ketones, etc., such as vinyl acetate, vinyl chloroacetate, vinyl alcohol, vinyl butyrate, isopropenyl acetate, vinyl formate, vinyl acrylate, vinyl methacrylate, vinyl methoxyacetate, vinyl benzoate, vinyl iodide, vinyltoluene, vinylnaphthalene, vinyl bromide, vinyl fluoride, vinylidene bromide, 1-chloro-1-fluoroethylene, vinylidene fluoride, vinyl methyl ether, vinyl ethyl ether, vinyl propyl ether, vinyl butyl ether, vinyl 2-ethylhexyl ether, vinyl phenyl ether, vinyl 2-butoxyethyl ether, 2,4-dihydro-1,2-pyran, 2-butoxy-2'-vinyloxy diethyl ether, vinyl 2-ethylthioethyl ether, vinyl methyl ketone, vinyl ethyl ketone, vinyl phenyl ketone, vinyl phosphonates such as bis(α-chloroethyl) vinylphosphonate, vinyl ethyl sulfide, vinyl ethyl sulfone, N-methyl-N-vinyl acetamide, N-vinylpyrrolidone, vinyl imidazole, divinyl sulfide, divinyl sulfoxide, divinyl sulfone, sodium vinylsulfonate, methyl vinylsulfonate, N-vinyl pyrrole, and the like; dimethyl fumarate, dimethyl maleate, maleic acid, crotonic acid, fumaric acid, itaconic acid, monomethyl itaconate, butylaminoethyl methacrylate, dimethylaminoethyl methacrylate, glycidyl acrylate, allyl alcohol, glycol monoesters of itaconic acid, dichlorobutadiene, vinyl pyridine, and the like. Any of the known polymerizable monomers can be used and the compounds listed above are illustrative and not restrictive of the monomers suitable for use in this invention. Preferably, the monomer is selected from the group consisting of acrylonitrile, styrene, methyl methacrylate and mixtures thereof.

Illustrative initiators which may be employed for the polymerization of vinyl monomers are the well-known free radical types of vinyl polymerization initiators, for example, the peroxides, persulfates, perborates, percarbonates, azo compounds, etc., including hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, di-α-cumyl peroxide, dipropyl peroxide, diisopropyl peroxide, isopropyl-t-butyl peroxide, butyl-t-butyl peroxide, difuroyl peroxide, ditriphenylmethyl peroxide, bis(p-methoxybenzoyl) peroxide, p-monomethoxybenzoyl peroxide, p-monoethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, α-methylbenzyl hydroperoxide, α-methyl-α-ethyl benzyl hydroperoxide, tetralin hydroperoxide, triphenylmethyl hydroperoxide, diphenylmethyl hydroperoxide, α-α'-azo-bis(2-methyl) butyronitrile, α,α'-azo-bis(2-methyl) heptonitrile, 1,1'-azo-bis(1-cyclohexane) carbonitrile, 1,1'-azo-bis(cyclohexane carbonitrile), α,α'-azobis(isobutyrate), dimethyl α,α'-azo-bis(isobutyronitrile), 4,4'-azo-bis(4-cyanopetanoic) acid, 2,2'-azo-bis(isobutyronitrile), 1-t-amylazo-1-cyanocyclohexane, 2,2'-azo-bis(2,4-dimethylvaleronitrile), 2-t-butylazo-2-cyano-4-methoxy-4-methylpentane, 2,2'-azo-bis-2-methylbutanenitrile, 2-t-butylazo-2-cyanobutane, 1-t-amylazo-1-cyanocyclohexane, 2,2'-azo-bis(2,4-dimethyl-4-methoxyvaleronitrile), 2,2'-azo-bis-2-methylbutyronitrile, 1,1'-azo-bis-cyclohexane-carbonitrile, 2-t-butylazo-2-cyano-4-methylpentane, 2-(t-butylazo)isobutyronitrile, 2-t-butylazo-2-isobutyronitrile, 2-t-butylazo-2-cyanobutane, 1- cyano-1-(t-butylazo)cyclohexane, t-butyl peroxy-2-ethylhexanoate, t-butylperpivalate, 2,5-dimethyl-hexane-2,5-diper-2-ethyl hexoate, t-butylperneo-decanoate, t-butylperbenzoate, t-butyl percrotonate, persuccinic acid, diisopropyl peroxydicarbonate, and the like; a mixture of initiators may also be used. Photochemically sensitive radical generators may also be employed. Generally, from about 0.5 percent to about 10 percent, preferably from about 1 percent to about 4 percent, by weight of initiator based on the weight of the monomer will be employed in the final polymerization.

Stabilizers may be employed during the process of making the graft polymer dispersions. One such example is the stabilizer disclosed in U.S. Pat. No. 4,148,840 which comprises a copolymer having a first portion composed of an ethylenically unsaturated monomer or mixture of such monomers and a second portion which is a propylene oxide polymer. Other stabilizers which may be employed are the alkylene oxide adducts of copolymers of styrene-allyl alcohol as disclosed in copending applications Ser. No. 179,136, now U.S. Pat. No. 4,334,049 and Ser. No. 179,137, now U.S. Pat. No. 4,327,005.

The conventional polyurethane foams employed in the present invention are generally prepared by the reaction of a polyoxyalkylene polyether polyol having a graft polymer content of at least 5 parts per 100 parts of polyol at least 3 parts by weight per 100 parts of polyol for high resiliency polyurethane foams with an organic polyisocyanate in the presence of a blowing agent and optionally in the presence of additional polyhydroxyl-containing components, chain-extending agents, catalysts, surface-active agents, stabilizers, dyes, fillers such as milled glass fibers and pigments. Suitable processes for the preparation of cellular polyurethane plastics are disclosed in U.S. Reissue Patent No. 24,514 together with suitable machinery to be used in conjunction therewith. It is also possible to proceed with the preparation of the polyurethane plastics by a prepolymer technique wherein an excess of organic polyisocyanate is reacted in a first step with the polyol of the present invention to prepare a prepolymer having free isocyanate groups which is then reacted in a second step with a blowing agent to prepare a foam. Alternately, the components may be reacted in a single working step commonly known as the "one-shot" technique of preparing polyurethanes. Low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoromethane, trichlorofluoromethane, dichlorodifluoroethane, vinylidene chloride, dichlorofluoromethane, dichloromethane, tricloromethane, dichlorofluoroethane, trichlorotrifluoromethane, hexafluorocyclobutane, and octafluorocyclobutane, may be used as blowing agents.

The organic polyisocyanate employed in the instant invention corresponds to the formula R'(NCO)z wherein R' is a polyvalent organic radical which is either aliphatic, arylalkyl, alkylaryl, aromatic or mixtures thereof and z is an integer which corresponds to the valence of R' and is at least 2. Representative of the types of organic polyisocyanates contemplated herein include, for example, 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl)ether, bis(3-isocyanatopropyl)sulfide, 1,7-diisocyanatoheptane, 1,5-diisocyanato-2,2-dimethylpentane, 1,6-diisocyanate-3-methoxyhexane, 1,8-diisocyanatooctane, 1,5-diisocyanato-2,2,4-trimethylpentane, 1,9-diisocyanatononane, 1,10-diisocyanatopropyl ether of 1,4-butylene glycol, 1,11-diisocyanatoundecane, 1,12-diisocyanatododecane, bis-(isocyanatohexyl)sulfide, 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitrobenzene, 2,5-diisocyanato-1-nitrobenzene, m-phenylene diisocyanate, 2,4-toluene diisocyanate, 2,6-toluene diisocyanate, mixtures of 2,4- and 2,6-toluene diisocyanate, 1,6-hexamethylene diisocyanate, 1,4-tetramethylene diisocyanate, 1,4-cyclohexane diisocyanate, hexahydrotoluene diisocyanate, 1,5-naphthylene diisocyanate, 1-methoxy-2,4-phenylene diisocyanate, 4,4'-cyclohexane diisocyanate, hexahydrotoluene diisocyanate, 1,5-naphthylene diisocyanate, 1-methoxy-2,4-phenylene diisocyanate, 4,4'-diphenylmethane diisocyanate, 4,4'-biphenylene diisocyanate, 3,3'-dimethyl-4,4'-diphenylmethane diisocyanate, 3,3'-dimethyl-4,4'-diphenylmethane diisocyanate and 3,3'-dimethyldiphenylmethane-4,4'-diisocyanate; the triisocyanates such as 4,4',4''-triphenylmethane triisocyanate, polymethylene polyphenylene polyisocyanate and 2,4,6-toluene triisocyanatate; and the tetraisocyanates such as 4,4'-dimethyl-2,2'-5,5'-diphenylmethane tetraisocyanate. Especially useful due to their availability and properties are toluene diisocyanate, 2,4'-diphenylmethane diisocyanate, 4,4'-diphenylmethane diisocyanate, polymethylene polyphenylene polyisocyanate, and mixtures thereof.

These polyisocyanates are prepared by conventional methods known in the art such as the phosgenation of the corresponding organic amine. Included within the useable isocyanates are the modifications of the above isocyanates which contain carbodiimide, allophonate or isocyanurate structures. Quasi-prepolymers may also be employed in the process of the subject invention. These quasi-prepolymers are prepared by reacting an excess of organic polyisocyanate or mixtures thereof with a minor amount of an active hydrogen-containing compound a determined by the well-known Zerewitinoff test, as described by Kohler in *Journal of the American Chemical Society*, 49, 3181 (1927). These compounds and their methods of preparation are well known in the art. The use of any one specific active hydrogen compound is not critical hereto, rather any such compound can be employed herein. Generally, the quasi-prepolymers have a free isocyanate content of from 20 percent to 40 percent by weight.

Crude polyisocyanate may also be used in the compositions of the present invention, such as crude toluene diisocyanate obtained by the phosgenation of a mixture of toluene diamines or crude polymethylene polyphenylene polyisocyanate obtained by the phosgenation of crude polymethylene polyphenylene polyamine.

The graft polymer polyols may be employed along with another polyhydroxyl-containing component commonly employed in the art. Any of the polyhydroxyl-containing components which are described above for use in the preparation of the graft polyols may be employed in the preparation of the polyurethane foams useful in the present invention.

Chain-extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, 1,4-butanediol, and primary and secondary diamines which react more readily with the polyisocyanates than does water. These include phenylenediamine, ethylenediamine, diethylenetriamine, N-(2-hydroxypropyl)-ethylenediamine, N,N'-di(2-hydroxypropyl)ethylenediamine, piperazine, and 2-methylpiperazine.

Catalysts that are useful in producing resilient polyurethane foams in accordance with this invention include:

A. tertiary amines such as triethylene diamine, bis(-dimethylamino ethyl)ether, triethylamine, N-methylmorpholine, N-ethylmorpholine, N,N-dimethylbenzylamine, N,N-dimethylethanolamine, and the like;

B. tertiary phosphines, such as, trialkyl phosphines, dialkyl benzyl phosphines, and the like;

C. strong bases such as alkaline and alkali earth metal hydroxides, and phenoxides;

acidic metal salts of strong acids such as ferric chloride, stannic chloride, stannous chloride, antimony trichloride, bismuth nitrate and chloride and the like;

E. chelates of various metals such as those obtained from acetylacetone, benzoyl acetone, ethyl acetoacetate and the like;

F. alcoholates and phenolates of various metals such as Ti(OR)$_4$, Sn(OR)$_2$, (Al(OR)$_3$, and the like wherein R is alkyl or aryl and the like;

G. salts of organic acids with a variety of metals such as alkali metals, alkaline earth metals, Al, Sn, Mn, Pb, Co, Ni, and Cu, including, for example, sodium acetate, potassium laurate, calcium hexanoate, stannous acetate, stannous octoate, stannous oleate, lead octoate, metallic dryers such as manganese and cobalt naphthenates, and the like;

H. organic metallic derivatives of tetravalent tin, trivalent and pentavalent arsenic, antimony and bismuth, and metal carbonyls of iron, cobalt and nickel.

The process and product thereof of this invention are explained further by the following examples. The parts given in the examples are by weight unless otherwise indicated. The following abbreviations are employed in the examples:

Polyol A is a propylene oxide ethylene oxide adduct of trimethylolpropane containing 13 percent ethylene oxide and having a hydroxyl number of 35.

Polyol B is a graft polymer dispersion of 21 percent vinyl polymer content 1:1 acrylonitrile:styrene prepared by the in situ polymerization of a 1:1 weight mixture of acrylonitrile:styrene in a polyol which a propylene oxide, ethylene oxide and alkyl glycidyl ether adduct of a mixture of glycerine and propylene glycol containing a 14 percent ethylene oxide cap and having a hydroxyl number of 33.

Isonate 181 is a urethane-modified diphenylmethane diisocyanate manufactured by Upjohn Chemical Corporation.

Isonate 143L is a carbodiimide-modified diphenylmethane diisocyanate manufactured by Upjohn Chemical Corporation.

EXAMPLES 1 & 2

A mixture was prepared by mixing 100 parts of Polyol A, 40 parts of ethylene glycol, 50 parts of milled fiber glass 1.59 mm in length, and from 0 to 0.05 part of wetting agent employing a paint shaker. The Brookfield viscosities of each mixture were determined at 25° C. and the mixtures were allowed to stand for 72 hours. The slurries were then tested for redispersibility by hand agitation. The results obtained are listed below in Table I.

TABLE I

| Example | Wetting Agent parts | Viscosity cps | Redispersibility |
|---|---|---|---|
| 1 | 0 | 13,400 | poor |
| 2 | 0.05 | 3,880 | excellent |

EXAMPLES 3-6

Hand mix foams were prepared employing the indicated formulations as shown in Table II in an aluminum plate mold at mold temperatures of 66° to 69° C., a mold time of 3 minutes, and the resulting foam part was post cured for 45 minutes at 121° C.

TABLE II

| | Examples | | | |
|---|---|---|---|---|
| | 3 | 4 | 5 | 6 |
| Formulation, pbw | | | | |
| Polyol A | 100 | 100 | 100 | 100 |
| Ethylene Glycol | 40 | 40 | 40 | 40 |
| Triethylenediamine | 0.5 | 0.5 | 0.5 | 0.5 |
| Dibutyltin dilaurate | 0.06 | 0.06 | 0.06 | 0.06 |
| BYKW980 | — | 0.05 | — | 0.05 |
| Milled Glass Fiber (1.59 mm) | — | — | 50 | 50 |
| Isonate 181 (105 Index) | | | | |
| Physical Properties | | | | |
| Density, kg/m$^3$ | 1029 | 1032 | 1063 | 987 |
| Tensile, MPa | 28.2 | 28.5 | 31.6 | 33.1 |
| Die C Tear, k N/m | 130 | 112.6 | 118.3 | 124.8 |
| Heat Sag, mm (121° C.) | 5.4 | 6.1 | 2.5 | 2.5 |
| Shore D Hardness | 66 | 68 | 67 | 70 |
| Tangential Modulus, MPa | | | | |
| 25° C. | 1409 | 1420 | 1738 | 1739 |
| 24° C. | 846 | 810 | 1271 | 1065 |
| 70° C. | 418 | 426 | 822 | 816 |
| Modulus Ratio | 3.37 | 3.33 | 2.11 | 2.13 |

This data indicates that no adverse effect on the properties appeared as a result of the addition of the wetting agent.

EXAMPLES 7-11

Machine foams were prepared employing the formulations indicated in Table III in an epoxy-fiberglass mold at temperatures from 35°-55° C. Demold time was one minute.

TABLE III

| | Examples | | | | |
|---|---|---|---|---|---|
| | 7 | 8 | 9 | 10 | 11 |
| Formulation, pbw | | | | | |
| Polyol B | 80 | 80 | 80 | 80 | 80 |
| Ethylene Glycol | 20 | 20 | 20 | 20 | 20 |
| Dibutyltin dilaurate | 0.1 | 0.1 | 0.1 | 0.1 | 0.1 |
| Milled Glass Fiber (1.59 mm) | — | — | 67 | 67 | 67 |
| BYKW980 | — | 0.5 | — | 0.25 | 0.5 |
| Isonate 143L (102 Index) | | | | | |
| Physical Properties | | | | | |
| Density, Kg/m$^3$ | 972 | 1031 | 1281 | 1230 | 1286 |
| Tensile, MPa | 25.5 | 28.2 | 42.3 | 40.7 | 37.2 |
| Die C Tear, kN/m | 109 | 146 | 142 | 138 | 155 |
| Elongation, % | 120 | 110 | 40 | 30 | 20 |
| Shore D Hardness | 58 | 60 | 63 | 64 | 68 |

TABLE III-continued

|  | Examples | | | | |
| --- | --- | --- | --- | --- | --- |
|  | 7 | 8 | 9 | 10 | 11 |
| Heat Sag, mm (121° C.) | 5.6 | 1.0 | 1.0 | 1.0 | 1.5 |
| Tangential Modulus, MPa | | | | | |
| 29° C. | 882 | 887 | 2502 | 2236 | 2922 |
| 24° C. | 474 | 475 | 1659 | 1693 | 1739 |
| 70° C. | 281 | 245 | 459 | 880 | 863 |
| Modulus Ratio | 3.14 | 3.61 | 2.61 | 2.54 | 3.39 |
| IZOD Impact, J/m | 379 | 438 | 331 | 315 | 278 |

This data further indicates that the physical properties are not adversely affected by the wetting agent.

The embodiments of the invention in which an exclusive privilege or property is claimed are defined as follows:

1. A process for the preparation of reinforced reaction injection molded polyurethane foam comprising reacting an organic polyisocyanate, a polyoxyalkylene polyether polyol, chain extending agent, catalyst, optionally a blowing agent, and milled glass fibers dispersed in said polyol employing an effective amount of a suspending agent which is a salt of the acid diester of the formula

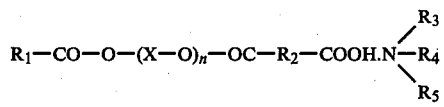

wherein

X represents an alkylene radical with 2 to 3 carbon atoms; $R_1$ represents a member selected from the group consisting of a saturated acyclic hydrocarbon radical having 11 to 23 carbon atoms, a saturated acyclic hydrocarbon having 11 to 23 carbon atoms and being substituted by a hydroxyl group, an olefinic acyclic hydrocarbon radical having 11 to 23 carbon atoms; and an olefinic acyclic hydrocarbon radical having 11 to 23 carbon atoms and being substituted by a hydroxyl group;

$R_2$ represents a member selected from the group consisting of a phenylene radical, a divalent saturated acyclic hydrocarbon radical, a divalent saturated acyclic hydrocarbon radical being substituted by a hydroxy group, a divalent saturated acyclic hydrocarbon radical being substituted by a carboxyl group, a divalent olefinic acyclic hydrocarbon radical, a divalent olefinic acyclic hydrocarbon radical being substituted by a hydroxyl group, and a divalent olefinic acyclic hydrocarbon radical being substituted by a carboxyl group, said divalent saturated and olefinic acyclic hydrocarbon radicals having 2 to 3 carbon atoms;

$R_3$ and $R_4$ represent members selected from the group consisting of hydrogen, a lower alkyl radical, a lower alkyl radical being substituted by hydroxyl group, and a cyclohexyl radical, said radicals containing from 1 to 6 carbon atoms;

$R_5$ represents a member selected from the group consisting of a lower alkyl radical, a lower alkyl radical substituted by a hydroxyl group, and a cyclohexyl radical, said radicals containing from 1 to 6 carbon atoms and n is an integer ranging from 4 to 25.

2. The process of claim 1 wherein the glass fibers have a filament length from 0.01 mm to 10 mm.

3. The process of claim 1 wherein the concentration of glass fibers is from about 5 percent to about 50 percent based on the weight of said foam.

4. The process of claim 1 wherein the polyol contains therein a graft polymer dispersion.

5. The product of claim 1.
6. The product of claim 2.
7. The product of claim 3.
8. The product of claim 4.

* * * * *